July 23, 1968 F. E. DE MONCHAUX ET AL 3,394,348

SYSTEM AND APPARATUS FOR AUTOMATIC DATA COLLECTION

Filed March 4, 1964 3 Sheets-Sheet 1

INVENTORS
F. E. DeMONCHAUX
O. H. CHALKER, JR
J. F. McNELLIS

BY Blair and Buckles
ATTORNEYS

SYSTEM AND APPARATUS FOR AUTOMATIC DATA COLLECTION

Filed March 4, 1964 3 Sheets-Sheet 2

MANUAL SPLIT LOAD CIRCUIT

SYSTEM AND APPARATUS FOR AUTOMATIC DATA COLLECTION

Filed March 4, 1964 3 Sheets-Sheet 3

AUTO SPLIT LOAD CIRCUIT

United States Patent Office 3,394,348
Patented July 23, 1968

3,394,348
SYSTEM AND APPARATUS FOR AUTOMATIC DATA COLLECTION

Francois E. de Monchaux, Woodbury, Oliver H. Chalker, Jr., Watertown, and Joseph F. McNellis, Thomaston, Conn., assignors to Control Data Corporation, Minneapolis, Minn.
Filed Mar. 4, 1964, Ser. No. 349,379
36 Claims. (Cl. 340—147)

ABSTRACT OF THE DISCLOSURE

A data transmission and collection system in which two central receiver recorders are available for connection to trunk lines. One or both of the central receiver-recorders are connected to the trunk lines depending upon load conditions or upon operator request.

This invention relates to a system and apparatus for automatic data collection. More particularly, it relates to the system and apparatus for automatic data collection disclosed in United States Patent No. 3,109,089, issued Oct. 29, 1963, to Andrew Craig Reynolds, Jr., et al., entitled, "Data Transmission Apparatus," and to United States patent application Ser. No. 863,227, filed Dec. 31, 1959 by Andrew Craig Reynolds Jr. et al., en titled, "System and Apparatus for Automatic Data Collection," and to United States patent application Ser. No. 312,699, filed Sept. 30, 1963, by George J. Yagusic et al., now Patent No. 3,296,596, entitled, "System and Apparatus for Automatic Data Collection." Said patent and applications are incorporated herein by reference.

The data collection system disclosed in the above-identified patent and patent applications comprises a plurality of data transmitting stations connected by a common communication cable to a central receiver-recorder. The latter Yagusic et al. application discloses a single wire, series connected, "search system" whereby only one of the transmitting stations may transmit to the central receiver-recorder at a time while the waiting time for transmission at each station during peak loading periods is equally shared; and whereby the selection of each transmitting station for transmission during peak loading periods takes place during the transmission of data from another transmitting station, thus minimizing the time between transmission from the transmitters.

*Other related applications*

It is contemplated that data collection systems according to the present invention and the above-identified patent and applications may also incorporate the inventions disclosed in the following United States patent applications:

Ser. No. 98,491, filed Mar. 27, 1961, now Patent No. 3,071,010, "Shaft Rocking Mechanism" by Raymond R. Lupkas.

Ser. No. 163,153, filed Dec. 29, 1961, now Patent No. 3,249,917, "System and Apparatus for Automatic Data Collection," by George J. Yagusic.

Ser. No. 196,672, filed May 22, 1962, "Automatic Card Reading System" by Andrew Craig Reynolds, Jr., Oliver H. Chalker, Jr. and Raymond R. Lupkas.

Ser. No. 205,659, filed June 27, 1962, now Patent No. 3,268,870, "System and Apparatus for Automatic Data Collection" by Oliver H. Chalker, Jr., George J. Yagusic and William E. O'Conner.

Ser. No. 229,001, filed Oct. 8, 1962, now Patent No. 3,303,472, "System and Apparatus for Automatic Data Collection" by Oliver H. Chalker, Jr., George J. Yagusic and Raymond R. Lupkas.

The above-identified applications are herein incorporated by reference.

*Uses of the system*

The automatic data collection system of the above-identified patent and copending applications may be used, for example, in factories where a plurality of data transmitters may be installed in different areas, shops, or departments, for transmission of manufacturing data to a central receiver-recorder which may be located in a central accounting office. Such data may include, for example: the number of units manufactured on particular machines; the designated job orders filled by machine operators; the identity and hourly wage rates of the machine operators; the total time required for each operation, etc. Alternatively, the apparatus of the invention may be used in warehouses and distribution centers for collection of order receipt and delivery time information for inventory control purposes, or in department stores for automatic collection of point of origin sales data, etc.

In a large factory, for example, there is, at present, a great deal of paper work required to be done in the various shops and departments, including the preparation of such handwritten reports as time tickets for payroll entries, production and inventory control records, cost accounting records, quality control inspection and scheduling reports, etc. For automatic central office computing, this mass of data now has to be individually punched into cards by manual operations, and the punched cards have to be verified by human operators before they can be fed to tabulating or computer apparatus. Various systems which have heretofore been suggested for expediting the flow of this information into a central office have included the use of closed-circuit television, which introduces the added problem of human error in reading the data from a TV screen, and the use of intercommunicating telephone circuits, which frequently results in error from misunderstanding of the verbally relayed information. In these prior art systems, the multiplicity of personnel involved results in divided responsibility, which is quite undesirable.

The principle of the data transmission and collection system of the above identified patent and copending applications is to capture the required information at the point of origin, select, sort, and collate it automatically and substantially instantaneously and then to transmit infallibly the desired data to a central receiver-recorder where it is permanently punched into tape or recorded on some other common language medium which can be fed directly into an automatic computer or conventional tabulating equipment without further intervention or possibility of human error.

The system and apparatus disclosed herein and in the above-identified patent and copending applications is related to commercial embodiments of the system and apparatus disclosed in the United States Patent No. 2,918,654, issued Dec. 22, 1959 to Curtis Hillyer entitled "Automatic Information Transmission," and United States Patent No. 3,059,847, issued Oct. 23, 1962 to Curtis Hillyer, entitled "Data Transmission Apparatus," and the United States patent application of Curtis Hillyer entitled "Data Transmission Apparatus, filed Oct. 30, 1961, Ser. No. 148,501, now patent No. 3,229,036.

*Prior art and problems*

An important practical problem in installations of the data collection systems disclosed in the above-identified patent and applications is the great disparity in the number of transmissions from remote transmitting stations to central receiver-recorder required at different times during a working day or shift. For example, in an ordinary factory installation during a short period between shifts when workers are checking in or out and the information recorded on their identification badges is being transmitted from remote transmitters to the central receiver-recorder, there are a very large number of messages. On the other hand, most of the time during a shift, messages are widely spaced in time, occuring at the beginning or end of individual jobs, inventory operations and the like. Of course, every once in a while many transmitters will request for transmission during a short interval.

In order to obtain worker acceptance of a data collection system, it is necessary that the total time any worker is required to wait after setting up his message until it is transmitted below an acceptable maximum. For example, in many practical applications of the system and apparatus disclosed in the above-identified patents and applications it takes on the average of one second to transmit a message. If no worker is to be made to wait more than thirty seconds after having set up his message before it is transmitted, in order to handle peak message loading periods, only thirty transmitters may be connected to a single central receiver-recorder.

On the other hand during periods of low message activity, as many as sixty or more transmitters might be connected to a single central receiver-recorder.

If, in our example, two central receiver-recorders are provided, each connected to receive messages from thirty data transmitters, the peak loading problem will be solved. However, during periods of relative inactivity, messages will be recorded on two separate output mediums and these will have to be combined before further data processing.

Even in an installation where a relatively small number of data transmitters are required, and the disadvantages of having them all connected to a single central receiver-recorder during peak loading periods are commercially acceptable, for purposes of system reliability, it is almost always required to provide a second "stand-by" central receiver-recorder in case of failure of the "on-line" central receiver-recorder.

It is also desirable in data collection systems of this type to sort messages so that those requiring specific action may be acted upon as soon as possible. For example, it is desirable that all "in and out" recording of workers arriving and leaving on time be on one medium for payroll accounting, work scheduling and the like, and that late arrivals and early departures be recorded on another for special attention.

*Objects*

Accordingly, it is an object of the present invention to provide a data collection system for the efficient and speedy collection of data during peak message loading periods.

Another object of the present invention is to provide a data collection system of the above character for the efficient collection of data during off peak message loading periods.

Still nother object of the invention is to provide a data collection system of the above character providing a stand-by central receiver-recorder for replacing an on-line central receiver-recorder that becomes unable to receive messages.

A further object of the present invention is to provide a means in a data collection system of the above character for recognizing peak message loading and off peak message loading periods and for taking appropriate action to insure the efficient collection of data during these periods.

Another object of the invention is to provide means in a data collection system of the above character for recognizing the inability of an on-line central receiver-recorder to receive messages and for taking appropriate action with respect to activating a stand-by central receiver-recorder.

A still further object of the invention is to provide a data collection system of the above character wherein messages are ordinarily recorded on a single output medium.

Still another object of the invention is to provide a data collection system of the above character wherein the maximum amount of time permitted between a request for transmission and a transmission from a remote transmitter is below an acceptable predetermined maximum.

Yet another object of the invention is to provide a data collection system of the above character wherein the apparatus required for obtaining the above objects is simple, inexpensive and trouble free in operation.

Yet a further object of the invention is to provide a data collection system of the above character wherein all messages of a predetermined kind are recorded on a single output medium during predetermined periods of time.

Other objects of the invention will in part be obvious and will in part appear hereinafter.

The invention accordingly comprises the means and features of operation and combinations of functions, and the relation of one or more of such operations and functions with respect to each of the others of the system; and apparatus embodying features of construction, combinations of elements and arrangements of parts which are adapted to effect such operations and functions; all as exemplified in the following detailed disclosure.

The scope of the invention will be indicated in the claims.

*Figures*

For a more complete understanding of the nature and objects of the invention, reference should be had to the following detailed description, taken in connection with the accompanying drawings, in which.

Figures 1, 2:
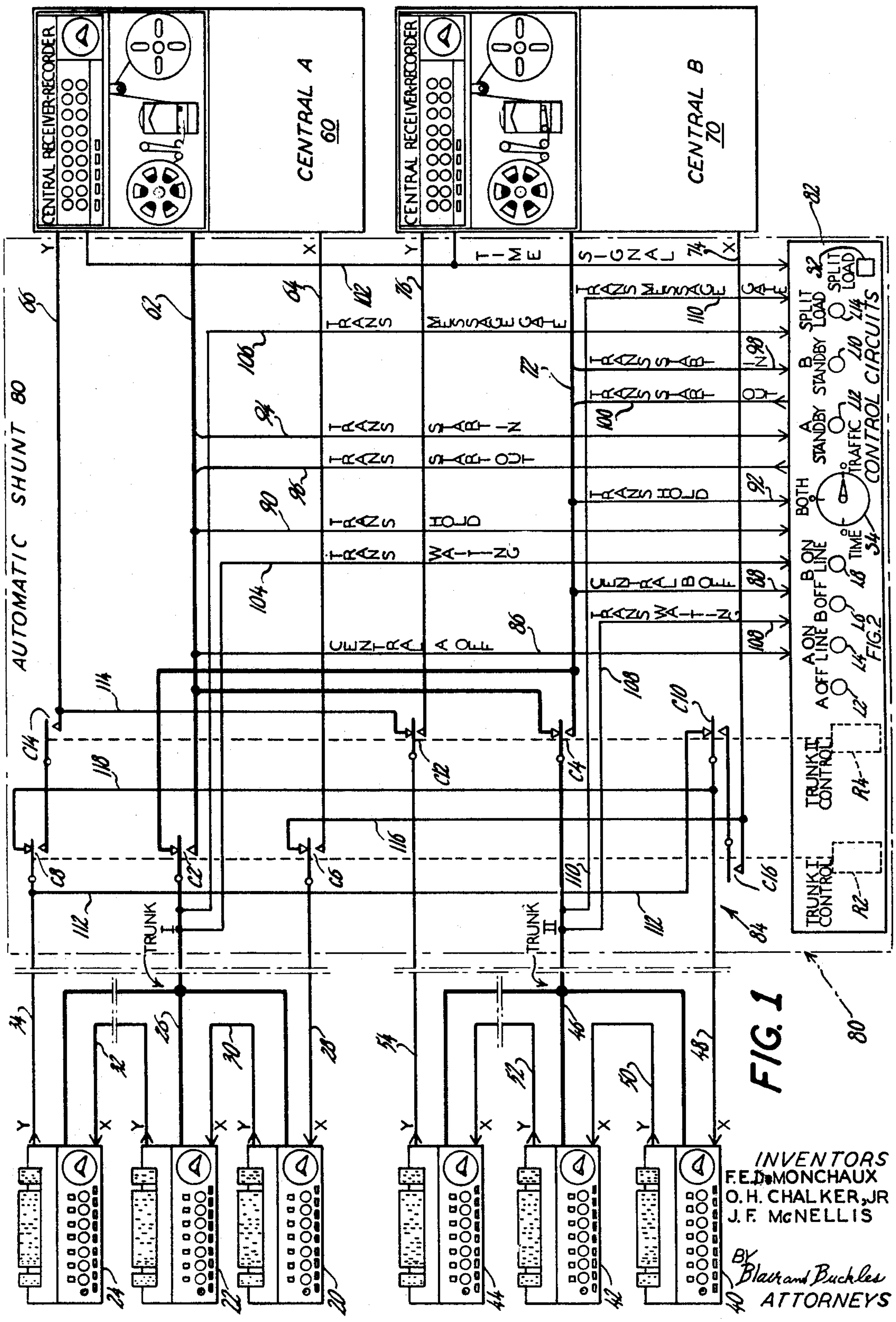
FIGURE 1 is an over-all block diagram of the preferred embodiment of the data collection system according to the present invention wherein the automatic shunt provided by the present invention is, in part, shown in schematic form.
FIGURE 2 is a schematic wiring diagram of the automatic shunt of FIGURE 1, and comprises FIGURES 2A and 2B.

Reference should be had to the above-identified copending application Ser. No. 312,699, now Patent No. 3,296,596, for a detailed disclosure of the search system employed in the present invention and to the above-identified copending application Ser. No. 863,227 for a detailed disclosure of the central receiver-recorders shown in FIGURE 1 thereof.

The same reference characters refer to the same elements in the several views of the drawings.

*General description*

The data collection system of the present invention generally comprises two groups of data transmitters. Each group of transmitters is connected via common control and communications channels to a remote central receiving office. Thus, there are two parallel data communication and control "trunks" from the two groups of data transmitters terminating at the central receiving office.

Searching, that is, conditioning data transmitters for data transmission is accomplished among the transmitters connected to each trunk by means of the parallel control channels and the series "chain circuit" disclosed in the above-identified United States patent application Ser. No. 312,699, now Patent No. 3,296,596.

There are two central receiver-recorders at the central office constructed in the manner described in the above-identified patents and copending applications, particularly application Ser. No. 863,227.

The present invention provides a new unit known as an "automatic shunt" at the central receiving office for connecting the two trunk lines to the appropriate central receiver-recorder or recorders according to preselected message loading conditions, at predetermined times and upon operator request.

Normally both trunk lines are connected in parallel to a single central receiver-recorder and the chain circuits of the respective trunk lines are connected into a single chain circuit to the same central receiver-recorder. This "on-line" recorder is the first recorder put into the message receiving condition by the operator. The other central receiver-recorder, if in a message receiving condition, normally is in a "stand-by" condition and receives no messages.

If the on-line central receiver-recorder for any reason becomes incapable of receiving messages, both trunks and the combined chain circuit are immediately connected to the stand-by central receiver-recorder which then receives messages from the remote transmitters.

Upon operator command, the automatic shunt will at the conclusion of a message in progress, immediately split the load, connecting each trunk and its chain circuit to a different central receiver-recorder.

The kind of transmitters connected to each trunk may be chosen to make full use of this "split load" feature. For example, general purpose transmitters for recording various kinds of job and inventory information may be connected to one trunk and badge readers or in and out recorders such as those described in the above-identified applications Ser. Nos. 196,627 and 229,001, now Patent No. 3,303,472, may be connected to the other trunk line. By selecting the split load condition for periods just prior to and just subsequent to each work shift, all in and out messages may be recorded on a single output medium by a single central receiver-recorder. Any messages generated by workers arriving late or leaving early will be recorded by the other central receiver-recorder. This recorder may be connected to exception recognizing equipment for taking immediate appropriate action upon receipt of such exceptional messages.

The automatic shunt may also comprise an automatic split load circuit, if the customer so desires, for recognizing automatically certain predetermined conditions indicating greater than normal message activity; whereupon the automatic shunt will automatically split the load, connecting each trunk to an individual central receiver-recorder. This unit will also bring about this split load condition upon receipt of a control signal ordinarily supplied from the central receiver-recorders at predetermined times, for example, at the beginning and at the end of shifts. Furthermore, the automatic split load circuit may be preconditioned by the operator to provide the split load condition only upon the occurrence of unusual message traffic or only upon the occurrence of the above noted time signal.

If, during the split load condition, one of the central receiver-recorders becomes incapable of receiving messages its associated trunk will automatically be connected to the other central receiver-recorder.

*Specific description*

Now referring to FIGURE 1, in the data collection system of the present invention, a first plurality of data transmitters 20, 22, 24 are connected in parallel to data communication and control conductors 26 and in a chain circuit comprised of conductors 28, 30, 32 and 34 (in the manner disclosed in the above-identified application, Ser. No. 312,699, now Patent No. 3,296,596). This group of transmitters and conductors is hereinafter collectively referred to as TRUNK I.

A second plurality of data transmitters 40, 42 and 44 are connected to a second group of parallel communication and control conductors 46 and in a chain circuit comprised of conductors 48, 50, 52 and 54 (also in the manner disclosed in the above-identified application, Ser. No. 312,699). This group of transmitters and conductors is hereinafter collectively referred to as TRUNK II.

A first central receiver-recorder constructed in accordance with the above-identified patents and applications, particularly applications Ser. Nos. 863,227 and 312,699, now Patent No. 3,296,596, is located at a central office. A second central receiver-recorder 70, constructed in the same manner, is also located at the central office. The central receiver-recorder 60 will hereinafter be called CENTRAL A and central receiver-recorder 70 will hereinafter be called CENTRAL B.

CENTRAL A is connected to a plurality of control and data communication conductors 62 and provides an outgoing X search conductor 64 and an incoming Y search conductor 66 for connection to a search chain circuit.

CENTRAL B is connected to common control and communication conductors 72 and provides an X search conductor 74 and a Y search conductor 76, also for connection in a search chain circuit.

There is also provided at the central office a novel unit 80 called an AUTOMATIC SHUNT that is connected between TRUNK I and TRUNK II and CENTRAL A and CENTRAL B.

The AUTOMATIC SHUNT 80 provides a plurality of indicator lights L2, L4, L6, L8, L10, L12 and L14 for indicating the condition of message transmission and receipt; and a manual split load switch S2 for automatically causing TRUNK I to be connected for transmission to CENTRAL A and TRUNK II to be connected for transmission to CENTRAL B. If desired by the customer, the AUTOMATIC SHUNT 80 provides an automatic split load control switch S4 for controlling the conditions under which the AUTOMATIC SHUNT will automatically connect TRUNK I to CENTRAL A and TRUNK II to CENTRAL B, hereinafter called the split load condition.

Figures 2A, 3:
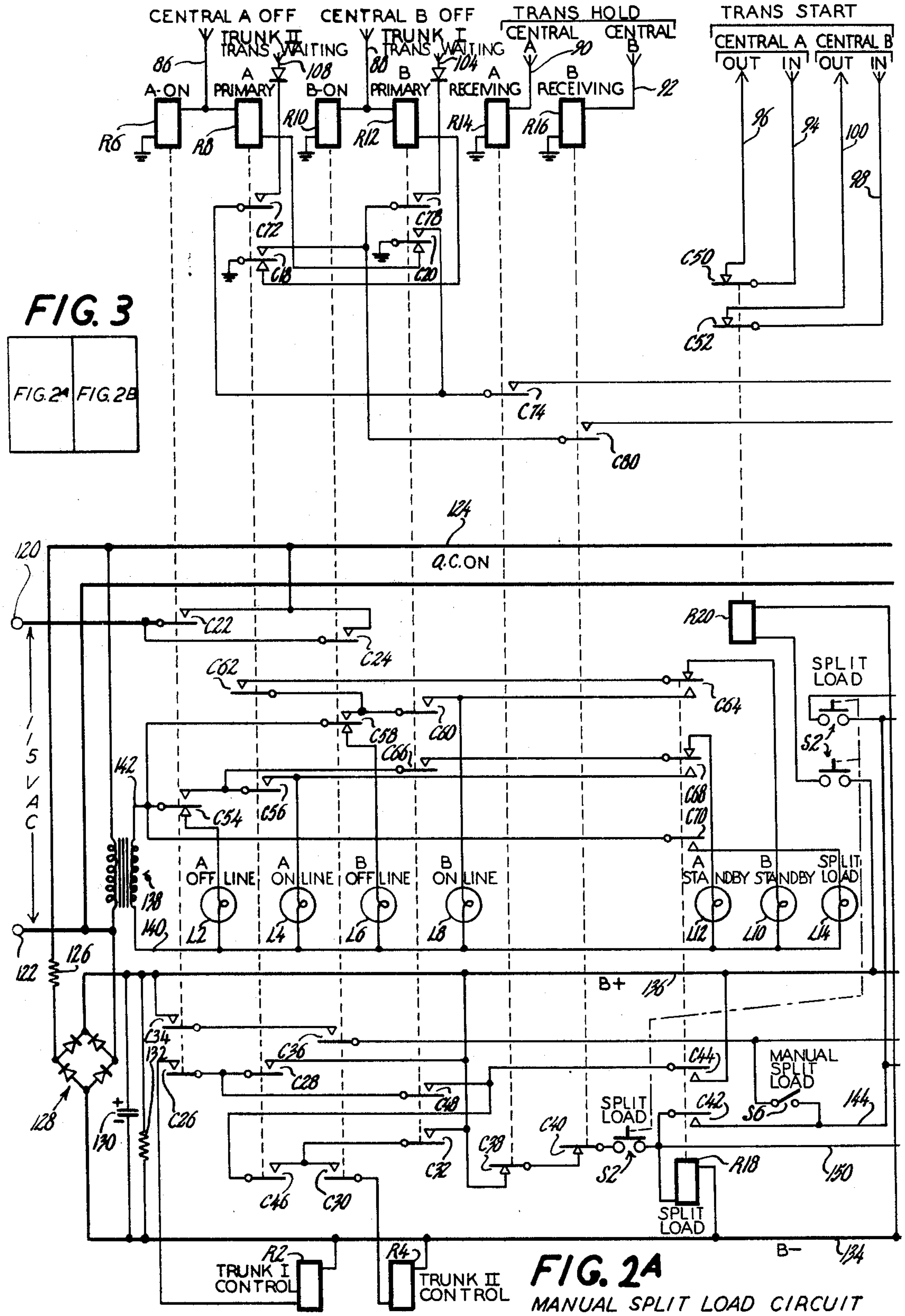
FIGURE 2A is a schematic wiring diagram of the manual split load circuit of the automatic shunt of FIGURE 1.
FIGURE 3 is a diagram showing how FIGURES 2A and 2B may be combined to form FIGURE 2.
Figure 2B:
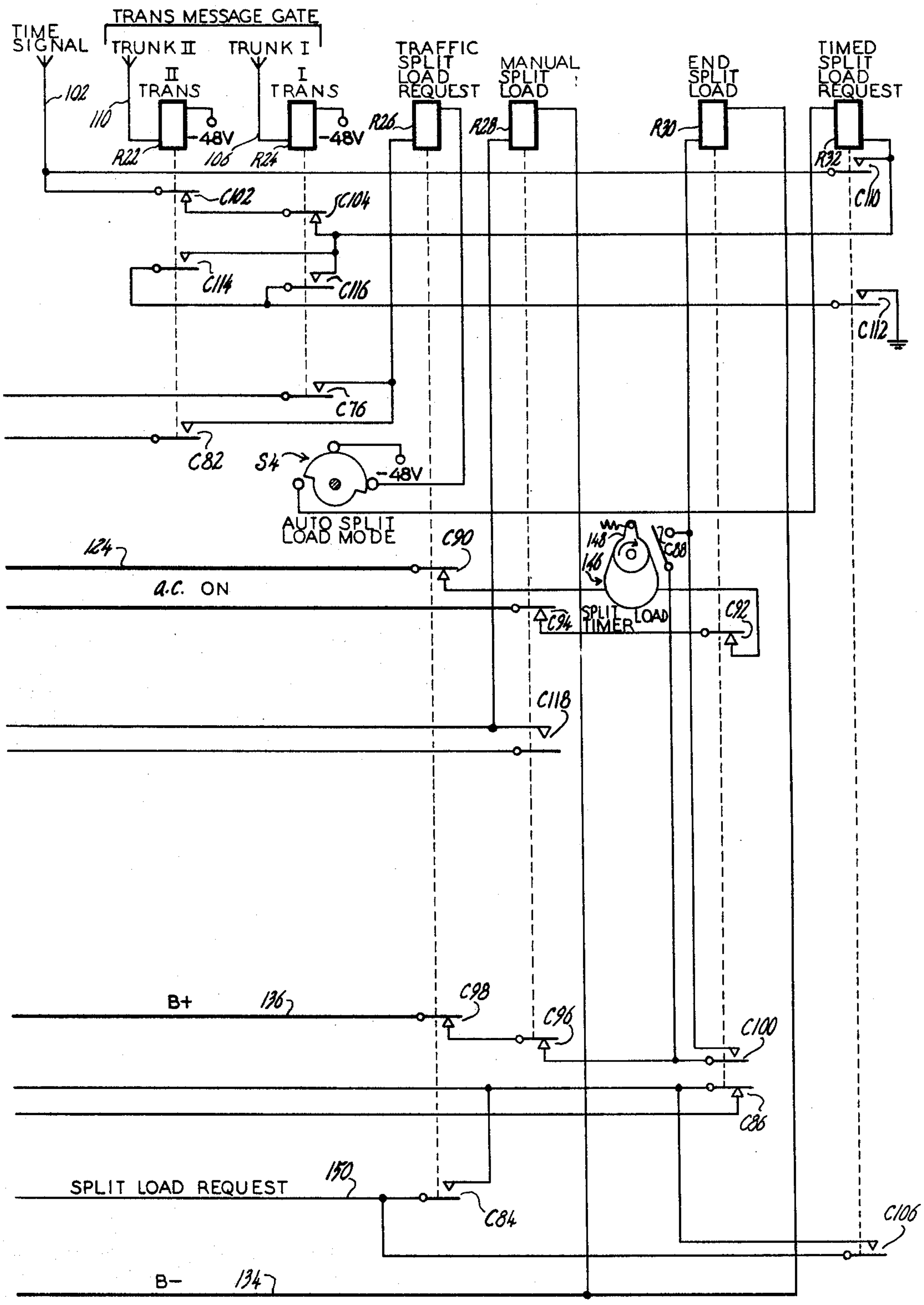
FIGURE 2B is a schematic wiring diagram of the automatic split load circuit of the automatic shunt of FIGURE 1.

The AUTOMATIC SHUNT 80 includes a plurality of control circuits 82, shown in detail in FIGURE 2 (comprising FIGURE 2A and 2B).

The AUTOMATIC SHUNT 80 includes a pair of control relays R2 and R4 hereinafter respectively referred to as TRUNK I CONTROL RELAY and TRUNK II CONTROL RELAY, respectively, and trunk control circuitry, generally indicated at 84, for controlling the connection of TRUNK I and TRUNK II to central receiver-recorders A and B.

When either of the central receiver-recorders is in condition to receive messages, this condition will be recognized by the control circuit 82 of the AUTOMATIC SHUNT 80, since it monitors CENTRAL OFF lines 86 and 88. When either central receiver-recorder is on, one or both of the TRUNK CONTROL RELAYS R2 and R4 will be energized. They will only be in their de-energized condition shown in FIGURE 1 when neither central receiver-recorder is in condition to receive messages. Although the parallel conductors 26 of TRUNK I (with both relays R2 and R4 de-energized, as shown in FIGURE 1) are connected to the parallel conductors 72 of CENTRAL B and the parallel conductors 46 of TRUNK II are connected to the parallel conductors 62 of CENTRAL A, an inspection of the trunk control circuitry 84 will indicate that a chain circuit is completed to neither of the central receiver-recorders.

When *only* the TRUNK I CONTROL RELAY R2 is energized, TRUNK I and TRUNK II will *both* be connected to CENTRAL A.

When *only* the TRUNK II CONTROL RELAY R4 is energized, TRUNK I and TRUNK II will *both* be connected to CENTRAL B.

When *both* the TRUNK I and TRUNK II CONTROL RELAYS R2 and R4 are energized, the system is in the split load condition and TRUNK I is connected to CENTRAL B.

Thus when TRUNK I CONTROL RELAY R2 is energized, contacts C2 thereof transfer, to connect the parallel data and control conductors 26 of TRUNK I to the parallel data and control conductors 62 connected to CENTRAL A. It should be understood, of course, that contacts C2 are representative of a plurality of similar contacts all operated simultaneously by TRUNK I CONTROL RELAY R2, each controlling the connection of one of the parallel conductors of the cable.

When TRUNK II CONTROL RELAY R4 is energized, contacts C4 thereof transfer, to connect the parallel data and control conductors 46 of TRUNK II to the parallel data and control conductors 72 connected to CENTRAL B. Again, it should be understood that contacts C4 are representative of a plurality of contacts, each controlling the connection of one particular parallel conductor.

When TRUNK I CONTROL RELAY R2 is energized, contacts C6 and C8 thereof transfer, and, if TRUNK II CONTROL RELAY R4 remains de-energized, contacts C6 and C8 complete a search loop from the X conductor 64 of CENTRAL A through contacts C6, through conductors 28, 30, 32 and 34 of TRUNK I, via conductor 112, through contacts C10 of TRUNK II CONTROL RELAY R4, through conductors 48, 50, 52 and 54 of TRUNK II, contacts C12 of relay R4, conductor 114 and Y conductor 66 to CENTRAL A. Thus, when TRUNK I CONTROL RELAY R2 is energized and TRUNK II CONTROL RELAY R4 is de-energized both TRUNK I and TRUNK II are connected for transmission and control to CENTRAL A.

If TRUNK II CONTROL RELAY R4 is energized and TRUNK I CONTROL RELAY R2 is de-energized, it will be seen that the contacts C2 and C4 will connect the parallel conductors 26 and 46 to the parallel conductors 72 of CENTRAL B. The search loop will be completed to CENTRAL B from its X conductor 74 via conductor 116 through contacts C6, through conductors 28, 30, 32 and 34 of TRUNK I, via conductor 118 to conductor 48 and through conductors 50, 52 and 54 of TRUNK II and through transferred contacts C12 to the Y conductor 76 of CENTRAL B.

If both TRUNK CONTROL RELAYS R2 and R4 are energized, TRUNK I CONTROL RELAY R2 will connect TRUNK I parallel conductors 26 to CENTRAL A via contacts C2 and TRUNK II CONTROL RELAY R4 will connect parallel conductors 46 via contacts C4 to CENTRAL B. The search loop of TRUNK I will be connected to CENTRAL A via X conductor 64, through contacts C6, conductors 28, 30, 32 and 34 of TRUNK I, through contacts C8 of relay R2 and C14 of relay R4 to Y conductor 66 of CENTRAL A. The search loop of TRUNK II will be connected to CENTRAL V via X conductor 74 through contacts C16 and R2, transferred contacts C10 of R4, conductors 48, 50, 52 and 54 of TRUNK II, and transferred contacts C12 of R4 to Y conductor 76 of CENTRAL B.

As stated above, normally, both TRUNK I and TRUNK II will be connected to the first central receiver-recorder which is conditioned to receive messages by the AUTOMATIC SHUNT 80 monitoring CENTRAL OFF conductors 86 and 88. When the operator desires to put the AUTOMATIC SHUNT 80 in the split load condition, he presses split load switch S2. If no messages are being transmitted, the AUTOMATIC SHUNT 80 will automatically energize both relays R2 and R4 to place the system in the split load condition.

The control circuit 82 of the AUTOMATIC SHUNT 80, however, also monitors the TRANSMITTER HOLD conductors 90 and 92 of the central receiver-recorders A and B respectively. A signal on either of these conductors, indicating that a message is being transmitted, will inhibit the AUTOMATIC SHUNT from producing the split load condition.

Since in the data communication system another message may be started immediately after the end of a message in progress if there is heavy traffic, the AUTOMATIC SHUNT prevents the initiation of further messages until producing the split load condition by controlling the transition of TRANSMITTER START signals from CENTRAL A and CENTRAL B via TRANSMITTER START IN conductor 94 and TRANSMITTER START OUT conductor 96 of CENTRAL A and TRANSMITTER START IN conductor 98 and TRANSMITTER START OUT conductor 100 of CENTRAL B.

For purposes to be described in detail below under the heading "Automatic Split Load Circuit" the AUTOMATIC SHUNT also may receive a demand signal for causing it to produce a split load condition over TIME SIGNAL conductor 102. It further monitors TRUNK I and TRUNK II in order to tell whether a transmitter is waiting to transmit or is transmitting a message by connections to TRANSMITTER WAITING conductor 104 and TRANSMITTER MESSAGE GATE conductor 106 of TRUNK I and TRANSMITTER WAITING conductor 108 and TRANSMITTER MESSAGE GATE conductor 110 of TRUNK II.

*Manual split load circuit*

Now referring to FIGURE 2A, the manual split load circuit comprises an A-ON relay R6 energized upon receipt of a —48 volt signal on CENTRAL A OFF conductor 86 whenever CENTRAL A is ready to receive messages. In the same manner a B-ON relay R10 is energized upon receipt of a —48 volt signal on CENTRAL B OFF conductor 86 indicating that CENTRAL B is ready to receive messages. Receipt of these signals on conductors 86 and 88 condition for energization A-PRIMARY relay R10 and B-PRIMARY relay R12, respectively, which are connected thereto for energization.

Only one of the PRIMARY relays R8 or R12 will be energized at the same time because upon the energization of one, contacts thereon disconnect the energization circuit of the other. For example, upon energization of A-PRIMARY relay R8, contacts C18 thereof transfer to disconnect B-PRIMARY relay R12 from ground. In the same manner, upon energization of B-PRIMARY relay R12, transfer of contacts C20 thereof disconnect the energization coil of A-PRIMARY relay R8 from ground.

Thus, the first central receiver-recorder that is turned on will cause the associated primary relay to energize. For example, if CENTRAL A is the first central receiver-recorder to be turned on the A-PRIMARY relay R8 will be energized and even when CENTRAL B is turned on B-PRIMARY relay R12 will not be energized.

The manual split load circuit also provides relays for determining when either of the central receiver-recorders is receiving messages. These are an A-RECEIVING relay R14 connected to energize upon receipt of a TRANSMITTER HOLD signal from CENTRAL A on conductor 90, and a B-RECEIVING relay R16 connected to energize upon receipt of a TRANSMITTER HOLD signal from CENTRAL B on conductor 92.

The AUTOMATIC SHUNT is connected to a source of a 115 volt A.C. power at terminals 120 and 122.

Whenever either one of the central receiver-recorders are on, energization of ON relay R6 or R10 closes contacts C22 or C24 thereof to connect A.C. ON conductor 124 to terminal 120. This connects in circuit a power supply comprising resistor 126, bridge rectifier 128, capacitor 130 and resistor 132 to provide 150 volts D.C. between B— conductor 134 and B+ conductor 136. Transformer 138 is also connected between conductor 124 and terminal 122 and provides low voltage A.C. between low voltage A.C. conductors 140 and 142.

Assuming that CENTRAL A was the first central receiver-recorder to be put into receiving condition, A-ON and A-PRIMARY relays R6 and R8 will be energized. Contacts C26 and C28 thereof will close, completing a circuit from B+ conductor 136 through contacts C28 and C26 to the energization coil of TRUNK CONTROL RELAY R2 to B− conductor 134. TRUNK I CONTROL RELAY R2 will therefore energize, connecting TRUNK I and TRUNK II to the ready-to-receive CENTRAL RECORDER A (FIGURE 1).

If CENTRAL B is the first central receiver-recorder to be turned on, B-ON relay R10 and B-PRIMARY relay R12 will be energized, closing contacts C30 and C32 thereof to complete an energization circuit from B+ conductor 136 through contacts C32 and C30, through the energization coil of TRUNK II CONTROL RELAY R4, to B− conductor 134. Energization of TRUNK II CONTROL RELAY R4 will connect TRUNK I and TRUNK II to CENTRAL B (FIGURE 1).

If both central receiver-recorders are on and the primary or "ON-LINE" central receiver-recorder for some reason should be turned off, the remaining, "STAND-BY," central receiver-recorder will immediately become the ON-LINE recorder. For example, if CENTRAL A is the ON LINE recorder and it turns off, de-energization of A-PRIMARY relay R8 will transfer contacts C18 thereof to immediately energize B-PRIMARY relay R12 to thus energize TRUNK II CONTROL RELAY R4. TRUNK CONTROL RELAY R2 will, of course, de-energize upon the opening of contacts C26 and C28 of A-ON and A-PRIMARY relays R6 and R8. Thus, the trunks will automatically be switched to the STAND-BY central receiver-recorder.

When the automatic split load circuit of FIGURE 2B is not required by the customer, a MANUAL SPLIT LOAD switch S6 in the AUTOMATIC SHUNT is permanently closed. If both central receiver-recorders are on, contacts C34 and C36 of A-ON and B-ON relays R6 and R10, respectively, will be closed, supplying B+ via conductor 136, through contacts C34 and C36 and through MANUAL SPLIT LOAD switch S6, to conductor 144.

When it is desired to put the AUTOMATIC SHUNT into the split load condition, the operator depresses the SPLIT LOAD switch S2. As Shown in FIGURE 2A, switch S2 has three sets of contacts. Closure of the lower set of contacts of switch S2 will, if no messages are being received, as indicated by the closure of normally closed contacts C38 and C40 of A-RECEIVING and B-RECEIVING relays R14 and R16, respectively, complete a circuit from B+ conductor 136, through contacts C38 and C40 and the lower split load switch contacts, to a SPLIT LOAD relay R18 to energize it. Closure of its contacts C42 will, if both central receiver-recorders are in condition to receive, as indicated by closure contacts C34 and C36, provide a holding circuit to SPLIT LOAD relay R18 from conductor 144.

Closure of contacts C44 of SPLIT LOAD relay R18 will, if CENTRAL A is the primary central receiver-recorder, complete a circuit through contacts C46 of A-PRIMARY relay R8 and contacts C30 of B-ON relay R10 to the TRUNK II CONTROL RELAY R4, to energize the same. When CENTRAL A is the primary central receiver-recorder, TRUNK I CONTROL RELAY R2 will already have been energized. Energization of TRUNK I and TRUNK II CONTROL RELAYS R2 and R4 simultaneously will connect TRUNK I to CENTRAL A and TRUNK II to CENTRAL B as prevously described with reference to FIGURE 1.

If CENTRAL B is the primary central receiver-recorder, contacts C48 of B-PRIMARY relay R12 will be closed and energization of SPLIT LOAD relay R18 will complete a circuit to energize TRUNK I CONTROL RELAY R2 through contacts C44, C48 and C26. Since in this case, CENTRAL B is the primary central receiver-recorder, TRUNK II CONTROL RELAY R4 will already have been energized and energization simultaneously of the two TRUNK CONTROL RELAYS R2 and R4 will connect the respective TRUNKS I and II to the respective central receiver-recorders, CENTRAL A and CENTRAL B.

As described in the above-identified copending patents and applications, in the data collection system for which the AUTOMATIC SHUNT hereof is specifically designed, during peak load conditions, immediately after one transmitter has completed its transmission the next transmitter will initiate its transmission, since the location of a waiting transmitter and conditioning it for transmission takes place during the transmission of the previous message.

In order to prevent initiation of another message when the split load switch S2 is operated and a message is being received, which might not allow contacts C38 and C40 to close long enough to energize SPLIT LOAD relay R18, and to prevent switching a trunk during the initial portion of a message, a relay R20 is provided. Relay R20 is energized by closure of the middle contacts of SPLIT LOAD relay S2. When relay R20 energizes, its contacts C50 and C52 open to disconnect the TRANSMITTER START conductors 94, 96, 98 and 100 of the central receiver-recorders over which the TRANSMITTER START signal that initiates transmissions is sent.

Thus, while the split load switch is depressed no messages may be initiated. Since transmission of an average will only have to hold the spit load switch for one second in order to cause the AUTOMATIC SHUNT to go into the split load condition.

If, during the split load condition, one of the central receiver-recorders is turned off the A-ON or B-ON relay will de-energize, opening contacts C34 or C36 thereof. This will disconnect SPLIT LOAD relay R18 from B+ conductor 136 and it will de-energize. De-energization of the appropriate ON relay will also open contacts C26 or C30, to de-energize the appropriate TRUNK CONTROL RELAY so that both TRUNKS will automatically be connected to the receiving central. This action, not only prevents loss of messages if a central receiver-recorder fails during the split load condition, but is used by the operator to end the condition. That is, when it is desired to end the split load condition, the operator merely turns off the central receiver-recorder he desires to become the STAND-BY central and the condition ends. He then turns the off central on and it becomes the STAND-BY central.

If both centrals go off, both ON relays R6 and R10 de-energize, opening contacts C26 and C30 thereof to immediately de-energize the TRUNK CONTROL RELAYS and opening contacts C22 and C24 thereof to disconnect A.C. conductor 124 to de-energize all relays connected to the power supply. Both trunks are then disconnected from both centrals.

The various indicator lamps are energized as follows: A-OFF lamp L2 will be energized via contacts C54 of A-ON relay R6. A-ON-LINE lamp L4 is energized via contacts C54 of A-ON-LINE relay R6 and contacts C56 of A-PRIMARY relay R8 when these relays are both energized. Similarly, B-OFF lamp L6 is energized via contacts C58 of B-ON relay R10 and B-ON-LINE lamp L8 is energized via contacts C60 of B-PRIMARY relay R12 and contacts C58 of B-ON relay R10 when these relays are both energized.

B-STAND-BY lamp L10 will be energized when CENTRAL A is the primary central and the AUTOMATIC SHUNT is not in the split load condition via contacts C58 of energized B-ON relay R10, contacts C62 of A-PRIMARY relay R8, and contacts C64 of SPLIT LOAD relay R18. A-STAND-BY lamp L12 will similarly be energized when CENTRAL A is on and CENTRAL B is the primary central via contacts C54 of energized A-ON relay R6, contacts C66 of energized B-PRIMARY relay R12, and contacts C68 of de-energized SPLIT LOAD relay R18.

Energization of SPLIT LOAD relay R18 will de-energize B-STAND-BY lamp L10, if it is energized, and energize B-ON-LINE lamp L8, if it is de-energized, by transferring contacts C64. Similarly, if A-STAND-BY lamp L12 is energized, transfer of contacts C68 of SPLIT LOAD relay R18, upon energization thereof, will de-energize A-STAND-BY lamp L12 and energize A-ON-LINE lamp L4. Energization of SPLIT LOAD relay R18 will close contacts C70, thereof, to energize SPLIT LOAD lamp L14.

*The automatic split load circuit*

If the customer so desires, an automatic split load circuit is provided by the present invention. In response to predetermined peak loading conditions or receipt of a TIME SIGNAL on conductor 102 (FIGURE 1), it places the AUTOMATIC SHUNT in the split load condition.

Now referring to FIGURE 2B, a TRUNK II TRANSMITTING relay R22 is provided, energized upon receipt of a TRANSMITTER MESSAGE GATE signal on TRUNK II conductor 110. Similarly, a TRUNK I TRANSMITTING relay R24 is energized upon receipt of TRANSMITTER MESSAGE GATE signal on TRUNK I conductor 106.

A TRAFFIC SPLIT LOAD REQUEST relay R26 is connected by the AUTOMATIC SPLIT LOAD MODE switch S4 to a source of −48 volts D.C. potential, if switch S4 is placed either in the "TRAFFIC" of "BOTH" settings shown in FIGURE 1.

TRAFFIC SPLIT LOAD REQUEST relay R26 will energize if a ground is received on TRUNK II TRANSMITTER WAITING conductor 108 (FIGURE 2A), if A-PRIMARY relay R8 is energized (indicated by closure of contacts C72 thereof), and if CENTRAL A is receiving (indicated by closure of contacts C74 of A-RECEIVING relay R14) and, if the transmitting transmitter is on TRUNK I as indicated by energization of TRUNK I TRANSMITTING relay R24 and closure of contacts C76 thereof.

Similarly, if CENTRAL B is the primary central receiver-recorder (indicated by closure of contacts C78 of B-PRIMARY relay R12), TRAFFIC SPLIT LOAD REQUEST relay R26 may be energized initially upon simultaneous receipt of a TRANSMITTER WAITING signal on TRUNK I conductor 104 and a TRANSMITTER HOLD signal from CENTRAL B on conductor 92 (indicated by closure of contacts C80 of B-RECEIVING relay R16) if the transmitting transmitter is on TRUNK II (indicated by closure of contacts C82 of TRUNK II TRANSMITTING relay R22.)

Thus, the condition for a traffic split load request is that a message is being received by the primary central receiver-recorder on the trunk line that will be connected to it in the split load condition (hereinafter called its "associated" trunk line) and that a transmitter on the other "alternate" trunk line is waiting to transmit a message.

Energization of TRAFFIC SPLIT LOAD REQUEST relay R26 closes contacts C84 thereof to initially energize SPLIT LOAD relay R18 via SPLIT LOAD REQUEST conductor 150.

The automatic split load circuit is also provided with a MANUAL SPLIT LOAD relay R28, an END SPLIT LOAD relay R30, and a TIMED SPLIT LOAD REQUEST relay R32.

Since the MANUAL SPLIT LOAD switch S6 is permanently opened when the automatic split load circuit is provided to the customer, other means are provided in the automatic split load circuit for completing a holding circuit to contacts C42 of SPLIT LOAD relay R18.

This means includes a SPLIT LOAD TIMER 146 in the automatic split load circuit of FIGURE 2B. The split load timer comprises a clock motor driving a spring loaded detent 148 so that, after the motor has been energized a predetermined length of time, detent 148 will close contacts C88. When the motor is de-energized, the spring returns detent 148 to its home position, opening contacts C88. The SPLIT LOAD TIMER 146 is normally energized via contacts C90 of TRAFFIC SPLIT LOAD REQUEST relay R26, contacts C92 of END SPLIT LOAD relay R30 and contacts C94 of MANUAL SPLIT LOAD relay R28.

Upon receipt of the initial split load request, energization of TRAFFIC SPLIT LOAD REQUEST relay R26 opens contacts C90 thereof to discontinue energization of the SPLIT LOAD TIMER 146 and detent 148 is returned home, opening contacts C88. END SPLIT LOAD REQUEST relay R30 then de-energizes. Contacts C86 thereof close to complete a holding circuit through contacts C42 of SPLIT LOAD relay R18 to continue energization thereof.

The SPLIT LOAD relay R18 will remain energized until the termination of this holding circuit when contacts C86 open, upon energization of END SPLIT LOAD relay R30.

TRAFFIC SPLIT LOAD REQUEST relay R26 will again energize during the split load condition when a transmitter is waiting to transmit on the alternate trunk line while a message is being received on the trunk connected to the primary central and when a message is being transmitted on the trunk line connected to the alternate central. For example, if CENTRAL B is the primary central, TRAFFIC SPLIT LOAD REQUEST relay R26 is energized via contacts C20 of B-PRIMARY relay R12, contacts C74 of A-RECEIVING relay R14 and contacts C76 of TRUNK I TRANSMITTING relay R24.

In other words, after initiation of the split load condition, the TRAFFIC SPLIT LOAD REQUEST relay R26 will energize whenever the primary central receiver-recorder is receiving a message and the alternate trunk is waiting to transmit a message, or whenever the alternate central receiver-recorder is receiving a message. Only when neither of these conditions exists will TRAFFIC SPLIT LOAD REQUEST relay R26 be de-energized closing contacts C90 thereof to energize the SPLIT LOAD TIMER 146.

SPLIT LOAD TIMER 146 may be set to thereafter close contacts C88 thereof after a predetermined interval, which is preferably approximately thirty seconds. If before the thirty seconds pass, TRAFFIC SPLIT LOAD REQUEST relay R26 re-energizes contacts C90 will open and the SPLIT LOAD TIMER will return to its home position. Only after de-energization of TRAFFIC SPLIT LOAD REQUEST relay R26 will the thirty seconds again begin to be measured.

After being energized continuously for thirty seconds, SPLIT LOAD TIMER 146 closes contacts C88 thereof to complete an energization circuit to the energization coil of END SPLIT LOAD REQUEST relay R30 via contacts C96 of MANUAL SPLIT LOAD REQUEST relay R28 and contacts C98 of TRAFFIC SPLIT LOAD REQUEST relay R26.

Closure of contacts C100 of END SPLIT LOAD REQUEST relay R30 closes a holding circuit to the energization coil of END SPLIT LOAD REQUEST relay R30. It then remains energized until there is a TRAFFIC SPLIT LOAD REQUEST or a MANUAL SPLIT LOAD REQUEST indicated by energization of relays R26 or R28, respectively. Opening of contacts C86 of END SPLIT LOAD REQUEST relay R30 discontinues the holding circuit to SPLIT LOAD relay R18 to end the split load condition.

During time periods when it is desired that the AUTOMATIC SHUNT automatically be put into the split load condition a ground will be supplied from one of the central receiver-recorders on TIME SIGNAL conductor 102 (FIGURES 1 and 2B). If neither trunk line is transmitting at this time, this will complete an energization circuit via contacts C102 and C104 of the TRUNK TRANSMITTING relays R22 and R24, respectively, to the energization coil of TIMED SPLIT LOAD REQUEST relay R32 so long as the AUTOMATIC SPLIT LOAD MODE switch S4 has been set to either the "TIME" or "BOTH" positions shown in FIGURE 1.

Energization of TIMED SPLIT LOAD REQUEST relay R32 closes contacts C106 thereof to energize SPLIT LOAD relay R18 via SPLIT LOAD REQUEST conductor 150.

Energization of TIMED SPLIT LOAD REQUEST relay R32 closes contacts C110 thereof to complete a holding circuit to it, so long as the TIME SIGNAL is received on conductor 102. An alternate holding circuit is completed by closure of contacts C112 of TIMED SPLIT LOAD REQUEST relay R32 and either of contacts C114 or contacts C116 of TRUNK II or TRUNK I TRANSMITTING relays R22 and R24, respectively. Thus, the TIMED SPLIT LOAD REQUEST relay R32 remains energized until the end of any message being transmitted at the end of the predetermined split load period when the TIME SIGNAL is discontinued.

The operator may put the unit in the split load condition by operating the SPLIT LOAD switch S2. The lower contacts thereof will, if neither central receiver-recorder is receiving a message, initially energize SPLIT LOAD relay R18 (FIGURE 2A). The middle contacts thereof will prevent initiation of transmission from any other transmitters through the energization of relay R20, as previously described. Closure of the upper contacts of the SPLIT LOAD switch S2 will complete an energization circuit via contacts C42 of SPLIT LOAD relay R18 to the MANUAL SPLIT LOAD relay R28 (FIGURE 2B).

Energization of MANUAL SPLIT LOAD relay R28 will close contacts C118, thereof, to complete a holding circuit to its energization coil. Opening of contacts C94 thereof will de-energize the SPLIT LOAD TIMER 146 and it will return to its home position, opening contacts C88. Opening of contacts C96 of MANUAL SPLIT LOAD relay R28 insures de-energization of END SPLIT LOAD relay R30. Closure of contacts C86, thereof, completes holding circuits to MANUAL SPLIT LOAD REQUEST relay R28 via contacts C118, thereof, and to SPLIT LOAD relay R18 via contacts C42, thereof.

Thus, the manually requested split load condition will continue until the operator turns off one of the central receiver-recorders to open contact C34 or C36 of A-ON or B-ON relays R6 or R10, respectively.

*Summary of invention*

Thus in the present invention, means are provided for connecting two groups of data transmitters via two trunk lines to two central receiver-recorders. Normally, both central receiver-recorders are turned on and are ready to receive messages. Means are provided to connect both trunk lines to the first central receiver-recorder ready to receive messages. This is called the primary central receiver-recorder. The second receiver-recorder is a standby. If the primary fails or is turned off for any reason, both trunk lines are automatically connected to the standby which automatically becomes the primary central receiver-recorder.

An operator may request a split load condition wherein each trunk line is connected to one of the central receiver-recorders automatically. Means are provided by the present invention for doing this without interrupting any messages in progress.

Means are provided for indicating to the operator the condition of each of the central receiver-recorders and whether the system is in the split load condition.

After manually initiating the split load condition, the operator may end the condition by turning off one of the central receiver-recorders, whereupon means provided by the present invention will automatically connect both trunk lines to the other central receiver-recorder. The same is true if one of the central receiver-recorders fails during the split load condition.

Automatic means are provided for initiating the split load condition upon certain predetermined message traffic conditions. Illustratively, this may be when the primary central receiver-recorded is receiving a message from the trunk line to be connected to it during the split load condition and a transmitter is waiting to transmit on the trunk line to be connected to the alternate central received-recorder during the split load condition. The split load condition is then maintained for a predetermined time subsequent to the last above-described split load request or to a split load request generated when the alternate central receiver-recorder is receiving a message.

Further automatic means are provided upon receipt of a time signal to place the system in the split load condition without interrupting messages in progress and to keep the system in such condition until termination of the predetermined signal.

Further means are provided for inhibiting the automatic split load apparatus when the unit is manually put into the split load condition so that the split load condition, so brought about, will be maintained until one of the central receiver-recorders is turned off.

Thus, transmitters originating special messages may be segregated to different trunks and under operator control, or at predetermined times, or under predetermined message conditions, each trunk is connected to a different central receiver-recorder to segregate the recording of the special messages.

It will thus be seen that the objects set forth above, among those made apparent from the preceding description, are efficiently attained and, since certain changes may be made in practicing the disclosed method of data collection and in the apparatus set forth without departing from the scope of the invention, it is intended that all matter contained in the above description or shown in the accompanying drawings shall be interpreted as illustrative and not in a limiting sense. It is to be understood, for example, that while the preferred embodiment discloses multiconductor communication and control cables as the intercommunicating links between transmitter or reader stations and the central receiver-recorder, the invention is not so limited but may be employed with other suitable types of communication channels such as, but not limited to, multiple frequency carrier circuits over a common conductor, or radio frequency communication channels which may be either amplitude or frequency modulated. Wherever thermionic and electromechanical switching devices have been disclosed herein it will be understood that equivalent electronic devices, including solid state devices such as transistors, may be substituted without departing from the invention.

Furthermore, other conditions for initiating the split load situation described herein, might be chosen without departing from the invention. For example, if a message is being received from either one of the trunk lines and the other trunk line is waiting for transmission. Furthermore, other control signals may be used to indicate or control certain transmission conditions. For example, the transmitter hold signal and the transmitter message gate signal on a trunk line may, in some instances, be interchanged for signalling and control purposes; and the purpose of relay R20, hereof, could be accomplished in the system disclosed in FIGURES 2 and 3 of the above-identified copending application, Ser. No. 312,699, now Patent No. 3,296,596, by controlling tranmission of the SEARCH CONTROL signals rather than the TRANSMITTER START signals, as disclosed herein.

It is also to be understood that the following claims are intended to cover all of the generic and specific features of the invention which, as a matter of language, might be said to fall therebetween, and to cover any system or apparatus employing means providing the claimed signals and functions for similar purposes.

Particularly, it is to be understood that in said claims, elements, signals or functions recited in the singular are intended to include compatible combinations of equivalent elements, signals or functions wherever the sense permits.

Having described our invention, what we claim as new and desire to secure by Letters Patent is:

1. A data collection system comprising, in combination:

(A) first and second trunk lines (a) each comprising data communication and control channels for connecting a plurality of data transmitters for transmission to a central receiver;

(B) first and second central receivers (a) for receiving messages transmitted on said trunk lines; and (C) means connected between said trunk lines and central receivers (a) for normally connecting both of said trunk lines for transmission to a "primary" one of said receivers; and, (b) responsive to a split load request signal to establish a split load condition by connecting said first trunk line for transmission to said first central receiver and said second trunk line for transmission to said second central receiver; and, (c) further responsive to inability of said primary central receiver to receive messages to thereupon connect said trunk lines for transmission to the other of said central receivers; and, (d) further responsive during said split load condition to inability of one of said central receivers to receive messages to connect the trunk connected to said disabled central receiver to the other central receiver; and, (D) means for generating a said split load request signal in response to predetermined message traffic conditions on said trunk lines, wherein, said means for generating said split load request signal in response to predetermined message traffic conditions does so when said primary central receiver is receiving a message transmitted on the trunk line to which it is connected during said split load condition at the same time that a transmitter connected to the other of said trunk lines is waiting to transmit a message.

2. The data collection system defined in claim 1, and:

(E) further means for maintaining said split load condition until a predetermined time subsequent to the termination of any said predetermined message traffic conditions, and to the termination of any transmission then in progress to the "alternate" one of said central receivers to which said trunk lines are not normally connected.

3. A data collection system comprising, in combination:

(A) first and second trunk lines (a) each comprising data communication and control channels for connecting a plurality of data transmitters for transmission to a central receiver;

(B) first and second central receivers (a) for receiving messages transmitted on said trunk lines; and (C) means connected between said trunk lines and said central receivers (a) for normally connecting both of said trunk lines for transmission to a "primary" one of said receivers; and (b) responsive to a split load request signal to establish a split load condition by connecting said first trunk line for transmission to said first central receiver and said second trunk line for transmission to said second central receiver; and, (c) further responsive to inability of said primary central receiver to receive messages to thereupon connect said trunk lines for transmission to the other of said central receivers; and, (d) further responsive during said split load condition to inability of one of said central receivers to receive messages to connect the trunk connected to said disabled central received to to the other central receiver; and, (D) manually operable means for generating said split load request signal when so operated and no message is being transmitted on the "alternate" trunk line to be connected during said split load condition to the "alternate" one of said central receivers to which said trunk lines are not normally connected.

4. The data collection system defined in claim 3, and:

(E) further means under control of said manually operable means for preventing during operation of said manually operable means the initiation of transmissions on said alternate trunk line.

5. The data collection system defined in claim 4, and:

(E) means responsive to a time signal for generating said split load request signal if no messages are being transmitted on said alternate trunk line.

6. The data collection system defined in claim 5, wherein said last named means continues generating said split load request signal so long as any messages are being transmitted on said alternate trunk line.

7. A data collection system comprising, in combination:

(A) first and second trunk lines (a) each comprising data communication and control channels for connecting a plurality of data transmitters for transmission to a central receiver;

(B) first and second central receivers (a) for receiving messages transmitted on said trunk lines; and (C) means connected between said trunk lines and said central receivers (a) for normally connecting both of said trunk lines for transmission to a "primary" one of said receivers; and, (b) responsive to a split load request signal to establish a split load condition by connecting said first trunk line for transmission to said first central receiver and said second trunk line for transmission to said second central receiver; and (c) further responsive to inability of said primary central receiver to receive messages to thereupon connect said trunk lines for transmission to the other of said central receivers; and, (d) further responsive during said split load condition to inability of one of said central receivers to receive messages to connect the trunk connected to said disabled central receiver to the other central receiver; and, (D) manually operable means for generating said split load request signal when so operated and no message is being received by either of said central receivers.

8. The data collection system defined in claim 7, and:

(E) further means under control of said manually operable means for preventing during operation of said manually operable means the initiation of transmissions on either of said trunk lines.

9. A data collection system comprising, in combination (A) first and second trunk lines (a) each comprising data communication and control channels for connecting a plurality of data transmitters for transmission to a central receiver;

(B) first and second central receivers (a) for receiving messages transmitted on said trunk lines;

(C) control means connected between said trunk lines and said central receivers
(a) for normally connecting both of said trunk lines for transmission to a "primary" one of said receivers; and,
(b) responsive to a split load request signal to establish a split load condition by connecting said first trunk line for transmission to said first central receiver and said second trunk line for transmission to said second central receiver;
(D) means for generating a said split load request signal in response to predetermined message traffic conditions on said trunk lines; and,
(E) means responsive to a time signal for generating said split load request signal at predetermined times.

10. The data collection system defined in claim 9, and:
(F) a mode switch for selectively inhibiting generation of said traffic or said time signal responsive split load request signals.

11. The data collection system defined in claim 10, and:
(G) a means including a plurality of indicator lights for indicating to an operator whether each of said central receivers is capable of receiving messages and is connected to receive messages, or is capable of receiving messages but is not connected to receive messages, and to indicate the existence of said split load condition.

12. The data collection system defined in claim 9, wherein said control means is:
(c) further responsive to inability of said primary central receiver to receive messages to thereupon connect said trunk lines for transmission to the other of said central receivers.

13. The data collection system defined in claim 12, wherein said control means is:
(d) further responsive during said split load condition to inability of one of said central receivers to receive messages to connect the trunk connected to said disabled central receiver to the other central receiver.

14. The data collection system defined in claim 9, wherein said control means is:
(d) further responsive during said split load condition to inability of one of said central receivers to receive messages to connect the trunk connected to said disabled central receiver to the other central receiver.

15. The data collection system defined in claim 9, wherein, said means for generating said split load request signal in response to predetermined message traffic conditions does so when said primary central receiver is receiving a message transmitted on the trunk line to which it is connected during said split load condition at the same time that a transmitter connected to the other of said trunk lines is waiting to transmit a message.

16. The data collection system defined in claim 15, and:
(F) further means for maintaining said split load condition until a predetermined time subsequent to the termination of any of said predetermined message traffic conditions and to the termination of any transmission then in progress to the "alternate" one of said central receivers to which said trunk lines are not normally connected.

17. The data collection system defined in claim 9, and:
(F) manually operable means for generating said split load request signal when so operated and no message is being transmitted on the "alternate" trunk line to be connected during said split load condition to the "alternate" one of said central receivers to which said trunk lines are not normally connected.

18. The data collection system defined in claim 17, and:
(G) further means under control of said manually operable means for preventing during operation of said manually operable means the initiation of transmissions on said alternate trunk line.

19. The data collection system defined in claim 9, and:
(F) manually operable means for generating said split load request signal when so operated and no message is being received by either of said central receivers.

20. The data collection system defined in claim 19, and:
(G) further means under control of said manually operable means for preventing during operation of said manually operable means the initation of transmissions on either of said trunk lines.

21. A data collection system comprising, in combination:
(A) first and second pluralities of remote data transmitters;
(B) first and second central receivers at a central office for receiving messages from said data transmitters;
(a) each said central receiver comprising means for generating an ON signal when it is ready to receive messages;
(C) first and second trunk lines connecting said first and second pluralities of data transmitters, respectively, to said central office; and,
(D) control means connected between said trunk lines and said central receivers
(a) responsive to said ON signals from said central receivers,
(b) normally connecting both of said trunk lines to a "primary" one of said central receivers that is generating said ON signal, and
(c) responsive to a split load request signal when receiving both of said ON signals to establish a "split load" condition by connecting said first trunk to said first central receiver and said second trunk to said second central receiver.

22. The data collection system defined in claim 21, wherein:
(d) said control means is further responsive to receipt of the first of said ON signals from one of said central receivers to establish the central receiver generating said first ON signal as the said primary central receiver.

23. The data collection system defined in claim 21, wherein:
(d) said control means is further responsive to termination of said ON signal from said primary central receiver to connect both of said trunk lines to the "alternate" other of said central receivers if it is generating said ON signal.

24. The data collection system defined in claim 21, wherein:
(d) said control means is responsive to termination of said ON signal from one of said central receivers during said split load condition to thereupon connect both of said trunk lines to the other central receiver if it is generating said ON signal.

25. The data collection system defined in claim 21, wherein:
(b) each of said central receives further comprises means for generating a receiving signal when it is receiving a message;
and:
(E) manually operable means for generating said split load signal if neither of said receiving signals and both of said ON signals are being received.

26. The data collection system defined in claim 25, wherein initiation of transmission from said data transmitters is controlled by transmission initiating signals transmitted on said trunk lines from said central receivers to said transmitters, and:
(F) further means at said central office for inhibiting said transmission initiating signals when said manual means is operated.

27. The data collection system defined in claim 21, wherein:
(a) said trunk lines each comprise (1) means for transmitting a transmitting signal when a message is being transmitted over the trunk line, and (2) means for transmitting a transmitter waiting signal when a transmitter is waiting to transmit on said trunk line;

and:

(E) traffic split load request means for generating said split load request signal in response to selected ones of said transmitter wating, said transmitting and said receiving signals when the said primary central receiver is receiving a message on the trunk line to which it is connected during said split load condition and a transmitter is waiting to transmit on the other of said trunk lines.

28. The data collection system defined in claim 27, wherein said traffic split load request means is further responsive to said receiving signals to continue generating said split load request signal until the termination of a receiving signal then in progress from the other "alternate" central receiver to which said trunk lines are not normally connected.

29. The data collection system defined in claim 28, and:

(F) further means for causing said control means to continue said split load condition for a predetermined time after termination of a split load request signal from said traffic split load request means.

30. The data collection system defined in claim 21, wherein said first plurality of remote data transmitters transmit a predetermined class of messages.

31. The data collection system defined in claim 21, wherein said first plurality of remote data transmitters generally transmit messages during predetermined time periods.

32. The data collection system defined in claim 21, wherein said first plurality of remote data transmitters transmit a predetermined class of messages and generally transmit messages during predetermined time periods.

33. The data collection system defined in claim 32, wherein said first plurality of remote data transmitters are workers' in and out recorders.

34. The data collection system defined in claim 21, wherein:

(a) each of said trunk lines comprises a series connected chain circuit for conditioning the said remote data transmitters connected to it for transmission; and wherein:

(d) said control means further comprises means (1) for normally connecting said chain circuits in series together with said primary central receiver, and (2) for connecting the chain circuit of said first trunk line to said first central receiver and the chain circuit of said second trunk line to said second central receiver during said split load condition.

35. The data collection system defined in claim 27, and:

(E) timed split load request means responsive to said transmitting signals and a time signal occurring at predetermined times to generate said split load request signal upon receipt of said time signal if no transmission is in progress and to continue generating said split load request signal until the termination of any message in progress upon the termination of said time signal.

36. The data collection system defined in claim 21, wherein:

(a) said trunk lines each comprise (1) means for transmitting a transmitting signal when a message is being transmitted over the trunk line;

and:

(E) timed split load request means responsive to said transmitting signals and a time signal occurring at predetermined times to generate said split load request signal upon receipt of said time signal if no transmission is in progress and to continue generating said split load request signal until the termination of any message in progress upon the termination of said time signal.

References Cited

UNITED STATES PATENTS

| | | | |
|---|---|---|---|
| 3,173,996 | 3/1965 | Rypinski | 343—177 XR |
| 3,253,259 | 5/1966 | Jacoby | 340—147 |

JOHN W. CALDWELL, *Primary Examiner.*

DONALD J. YUSKO, *Assistant Examiner.*